(12) United States Patent
Hoel et al.

(10) Patent No.: US 7,462,341 B2
(45) Date of Patent: Dec. 9, 2008

(54) METHOD FOR PRODUCTION OF TRICHLOROSILANE AND SILICON FOR USE IN THE PRODUCTION OF TRICHLOROSILANE

(75) Inventors: Jan-Otto Hoel, Trondheim (NO); Harry Morten Rong, Heimdal (NO); Torbjorn Roe, Trondheim (NO); Harald Arnljot Oye, Steinhaugen (NO)

(73) Assignee: Elkem AS, Oslo (NO)

( * ) Notice: Subject to any disclaimer, the term of this patent is extended or adjusted under 35 U.S.C. 154(b) by 330 days.

(21) Appl. No.: 10/563,781

(22) PCT Filed: Jun. 24, 2004

(86) PCT No.: PCT/NO2004/000186

§ 371 (c)(1),
(2), (4) Date: Sep. 12, 2006

(87) PCT Pub. No.: WO2005/003030

PCT Pub. Date: Jan. 13, 2005

(65) Prior Publication Data

US 2007/0086936 A1    Apr. 19, 2007

(30) Foreign Application Priority Data

Jul. 7, 2003    (NO)    ................... 20033093

(51) Int. Cl.
*C01B 33/107* (2006.01)
(52) U.S. Cl. ..................... 423/342; 423/341
(58) Field of Classification Search ............... 423/341, 423/342
See application file for complete search history.

(56) References Cited

U.S. PATENT DOCUMENTS

| | | | | |
|---|---|---|---|---|
| 2,380,995 A | * | 8/1945 | Rochow | 556/472 |
| 4,247,528 A | * | 1/1981 | Dosaj et al. | 117/11 |
| 4,585,643 A | * | 4/1986 | Barker, Jr. | 423/342 |
| 5,063,040 A | | 11/1991 | Ruff | |
| 5,338,876 A | * | 8/1994 | Jung et al. | 556/431 |
| 5,871,705 A | | 2/1999 | Sakata et al. | |
| 5,874,604 A | * | 2/1999 | Steiner et al. | 556/472 |
| 6,506,923 B2 | * | 1/2003 | Inukai et al. | 556/472 |
| 2002/0151737 A1 | * | 10/2002 | Kalchauer et al. | 556/472 |
| 2007/0248521 A1 | * | 10/2007 | Kutsovsky et al. | 423/324 |

FOREIGN PATENT DOCUMENTS

WO    WO0249754 A1    6/2002

OTHER PUBLICATIONS

Malysheva et al, "Phase changes of cathode copper", Russian Journal of Applied Chemistry, 49 (10), pp. 2236-2240.*
S. Wakamatsu et al., "Study on selectivity in trichlorosilane producing reaction", Silicon for the Chemical Industry IV, Geiranger, Norway, Jun. 3-5, 1998.

* cited by examiner

*Primary Examiner*—Ngoc-Yen M Nguyen
(74) *Attorney, Agent, or Firm*—Lucas & Mercanti, LLP

(57) ABSTRACT

The present invention relates to a method for the production of trichlorosilane by reaction of silicon with HCl gas at a temperature between 250 and 1100° C., and an absolute pressure of 0.5-30 atm in a fluidized bed reactor, in a stirred bed reactor or a solid bed reactor, where the silicon supplied to the reactor contains between 30 and 10.000 ppm chromium. The invention further relates to silicon for use in the production of trichlorosilane by reaction of silicon with HCl gas, containing between 30 and 10.000 ppm 10 chromium, the remaining except for normal impurities being silicon.

14 Claims, 5 Drawing Sheets

METHOD FOR PRODUCTION OF TRICHLOROSILANE AND SILICON FOR USE IN THE PRODUCTION OF TRICHLOROSILANE

FIELD OF INVENTION

The present invention relates to a method for the production of trichlorosilane by reaction of silicon by HCl gas and to silicon for the use in production of trichlorosilane.

BACKGROUND ART

In the method of production of trichlorosilane (TCS), metallurgical grade silicon is reacted with HCl gas in a fluidized bed reactor, in a stirred bed reactor or in a solid bed reactor. The process is generally carried out at a temperature between 250° and 1100° C. In the reaction other volatile silanes than TCS are formed, mainly silicon tetrachloride (STC). Since TCS normally is the preferred product, the selectivity of the reaction given as the molar ratio of TCS/(TCS+other silanes) is an important factor. The other important factor is the reactivity of the silicon, measured as first pass HCl conversion. Preferably more than 90% of HCl is converted to silanes, but industrially lower reactivity can be observed.

The selectivity and reactivity will depend strongly on the process temperature when silicon and HCl is reacted. According to the equilibrium calculation the amount of TCS should be about 20-40% (remaining is mainly STC) in the temperature range given above. However, in practical terms a significantly higher TCS selectivity is observed, and at temperatures below 400° C. it is possible to observe TCS selectivity of more than 90%. The reason for this big deviation from equilibrium is that the product composition is given by kinetic limitations (formation of active species on the silicon surface). Higher temperature will move the product distribution towards the equilibrium composition and the gap between the observed selectivity and the calculated selectivity will get smaller. Reactivity will increase with higher temperature. Coarser silicon particles (lumps) can therefore be used when the temperature is increased and still maintaining close to 100% HCl consumption.

Higher pressure will favor a higher-TCS selectivity. Metallurgical grade silicon contains a number of contaminating elements like Fe, Ca, Al, Mn, Ni, Zr, O, C, Zn, Ti, B, P and others. Some contaminants will either be inert to HCl like Fe and Ca and will form solid, stable compounds like $FeCl_2$ and $CaCl_2$. The stable metal chlorides, will depending on their size, either be blown out of the reactor with the silane or be accumulated in the reactor. Other contaminants like Al, Zn, Ti, B and P form volatile metal chlorides, which leave the reactor together with the silanes produced.

O and C are enriched in slag particles of the silicon that do not react or react very slowly with HCl and tend to accumulate in the reactor. The smallest slag particles can be blown out of the reactor and trapped in the filter systems.

Many of the contaminants in metallurgical grade silicon influences the performance of the silicon in the process of producing trichlorosilane by reaction of silicon with HCl gas. Thus both the reactivity of the silicon and the selectivity can be effected both positively and negatively.

DISCLOSURE OF INVENTION

It has now been found that silicon having an increased chromium content provide a high selectivity when used in the method for the production of trichlorosilane by reaction with HCl. It has further been found that if the chromium content in the trichlorosilane reactor is controlled within certain limits an increase in selectivity is obtained.

According to a first aspect, the present invention relates to a method for the production of trichlorosilane by reaction of silicon with HCl gas at a temperature between 250° and 1100° C. and an absolute pressure of 0.5-30 atm in a fluidized bed reactor, in a stirred bed reactor or in a solid bed reactor, which method is characterized in that the silicon supplied to the reactor contains between 30 and 10 000 ppm of chromium.

Preferably the silicon supplied to the reactor contains between 50 and 1000 ppm chromium.

The chromium is the alloyed with the silicon, is mechanically mixed with the silicon or is added to the reactor separately.

The chromium can be alloyed to the silicon in the furnace process, in the refining ladle or in the casting step. Adding chromium to the furnace can be done in several ways. For instance by addition of chromium containing raw materials to the furnace, using electrodes or electrode casing/ribs containing chromium or any other addition of chromium to the furnace.

Chromium can also be added to the silicon during tapping of the furnace for instance by using chromium containing tapping tools or chromium containing materials in the tapping of the silicon from the furnace into the refining ladle.

Chromium can also be added to the silicon in the refining ladle. Any chromium compound added will be reduced by silicon to metallic chromium that will form different intermetallic phases when the silicon solidifies. Different ratios of the main impurities like iron, aluminum, calcium and iron can form different intermetallic phases with chromium.

Chromium can also be added to the silicon in the casting step, for instance by adding a chromium compound to the molten silicon, by using chromium compounds or chromium containing silicon in the casting moulds or by casting the silicon on a surface of a material containing chromium.

Chromium can also be mechanically mixed with silicon. One preferred way of mechanically mixing chromium with the silicon is to subject the silicon to grinding using chromium containing grinding bodies, such as for example chromium containing steel balls.

According to a second aspect, the present invention relates to a silicon for the use in the production of trichlorosilane by reaction of silicon with HCl gas, where the silicon contains between 30 and 10 000 ppm chromium, the remaining except for normal impurities being silicon.

Preferably the silicon contains between 50 and 1000 ppm chromium.

The silicon according to the present invention is produced in conventional way in carbothermic reduction furnaces. The chromium content in the silicon can either be regulated and controlled by selection of raw materials, adding chromium to the furnace, using electrodes or electrode casings containing chromium or chromium may be added to molten silicon in the ladle after the silicon has been tapped from the reduction furnace.

It has surprisingly been found that the addition of chromium to silicon improves the selectivity of TCS in the process of producing trichlorosilane.

According to a third aspect the present invention relates to a method for the producing of trichlorosilane by reaction of silicon with HCl gas at a temperature between 250° and 1100° C. and an absolute pressure of 0.5-30 atm in a fluidized bed reactor, in a stirred bed reactor or in a solid bed reactor, which method is characterized in that chromium is added to the reactor in an amount necessary to control a chromium content in the reactor of between 100 and 50 000 ppm based on the weight of silicon in the reactor.

Preferably chromium is supplied to the reactor in an amount necessary to control the chromium content in the reactor to between 250 and 25 000 ppm.

SHORT DESCRIPTION OF THE DRAWINGS

DETAILED DESCRIPTION OF THE INVENTION

Figure 1:
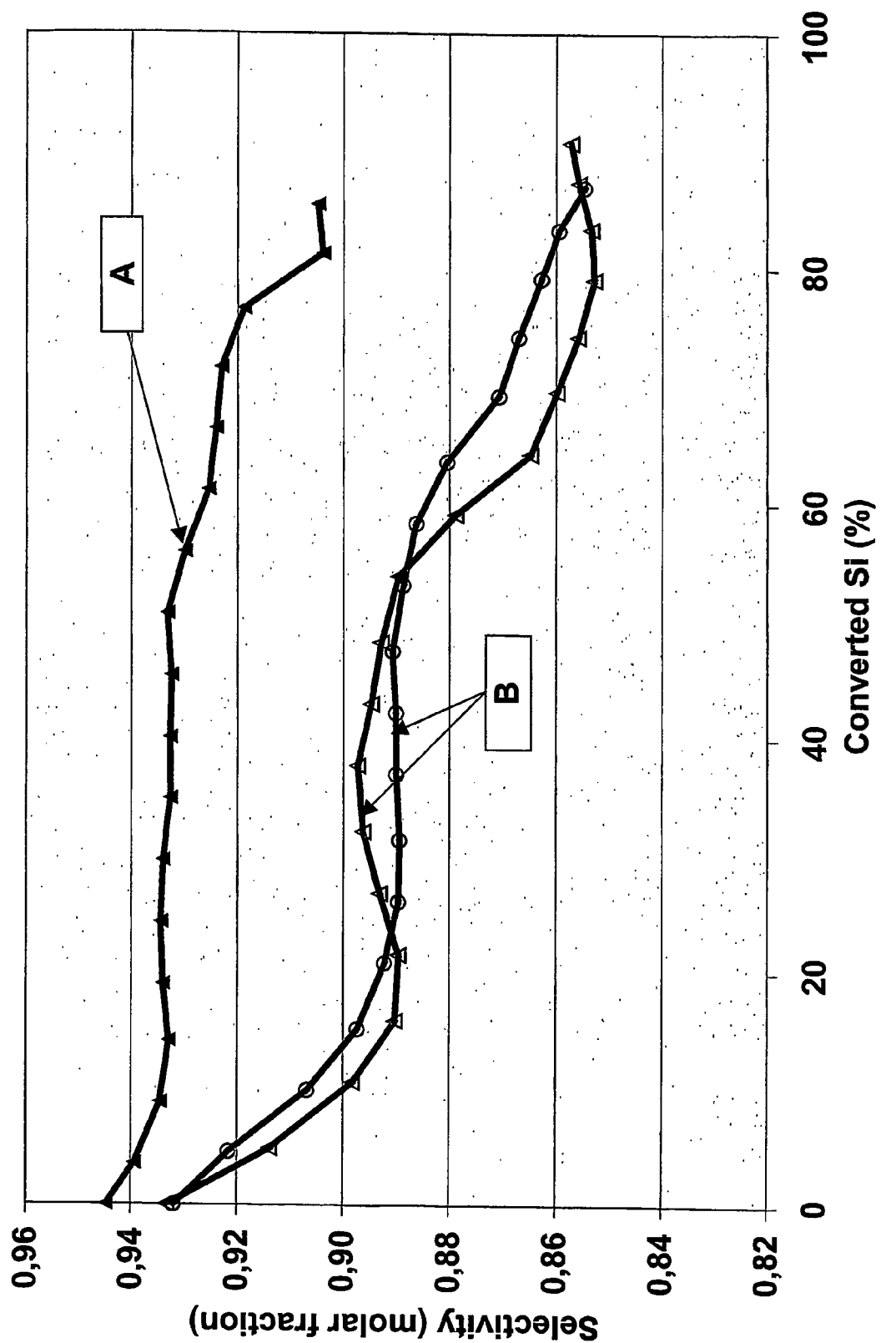
FIGS. 1 and 2 show diagrams for selectivity of TCS produced from commercially available silicon samples in a fixed bed reactor at 365° C. according to the present invention and compared with the TCS selectivity according to TCS produced according to prior art.

The following examples 1 to 3 were all carried out in a laboratory fixed-bed reactor made from quartz and embedded in a heated aluminum block. The temperature of the heating block was kept at 350° C. which gives a temperature in the reactor of 365° C. For each test 1 gram of silicon having a particle size of between 180 and 250 μm was added to the quartz reactor. A mixture of HCl and argon in an amount of 10 ml/min each was supplied to the reactor. The composition of the product gas from the reactor was measured with a GC. Selectivity was measured as TCS/(TCS+other silanes) and reactivity was measured as HCl conversion; that is the amount of HCl used in the reaction.

The following example 4 was carried out in a laboratory fluidized-bed reactor made from steel and embedded in a heated aluminum block. The reactor is started up with 5 grams of silicon having a particle size of between 180 and 250 μm. A mixture of HCl and argon in amounts of 280 ml/min and 20 ml/min respectively was supplied to the reactor. The temperature of the reactor is maintained at 325° C. during the run. As the reaction proceeds new silicon is added semi-continuously from the top of the reactor to maintain a total amount of 5 grams inside the reactor. The composition of the product gas from the reactor was measured with a GC. Selectivity was measured as TCS/(TCS+other silanes) and reactivity was measured as HCl conversion; that is the amount of HCl used in the reaction.

The following example 5 was carried out in a laboratory fixed-bed reactor made from quartz and embedded in a heated aluminum block. The temperature of the heating block was kept at 500° C. which gives a temperature in the reactor of 515° C. For each test 1 gram of silicon having a particle size of between 180 and 250 μm was added to the quartz reactor. A mixture of HCl and argon in an amount of 10 ml/min each was supplied to the reactor. The composition of the product gas from the reactor was measured with a GC. Selectivity was measured as TCS/(TCS+other silanes) and reactivity was measured as HCl conversion; that is the amount of HCl used in the reaction.

EXAMPLE 1

Metallurgical grade silicon produced by Elkem ASA was prepared by melting the silicon and adding phosphorus to the silicon to provide silicon containing 150 ppmw of phosphorus. The solidified phosphorus-containing silicon was crushed and milled to a particle size between 180 and 250 μm. 1% by weight of chromium powder was added to a part of the phosphorus-containing silicon. Thus two samples of phosphorus-containing silicon were made sample A containing 1% by weight of chromium and sample B containing no chromium except for minor impurity.

The chemical analysis of silicon samples A and B are shown in Table 1.

TABLE 1

|  | Sample A | Sample B |
| --- | --- | --- |
| Si % | 98.26 | 99.26 |
| Al % | 0.113 | 0.113 |
| Ca % | 0.002 | 0.002 |
| Fe % | 0.308 | 0.308 |
| Zr ppmw | 11 | 11 |
| Sr ppmw | <5 | <5 |
| Pb ppmw | <5 | <5 |
| Bi ppmw | <5 | <5 |
| As ppmw | <5 | <5 |
| Zn ppmw | <5 | <5 |
| Cu ppmw | 11 | 11 |
| Ni ppmw | 9 | 9 |
| Mn ppmw | 82 | 82 |
| Cr | 1% by weight | 13 ppmw |
| V ppmw | 13 | 13 |
| Ba ppmw | <5 | <5 |
| Ti ppmw | 227 | 227 |
| Mo ppmw | 19 | 19 |
| Sb ppmw | <5 | <5 |
| Sn ppmw | <5 | <5 |
| K ppmw | <5 | <5 |
| P ppmw | 150 | 150 |

Samples A and B were used to produce trichlorosilane in a laboratory fixed-bed reactor described above. Two parallel runs were made with sample B. The selectivity for TCS produced from samples A and B are shown in FIG. 1.

As can be seen from FIG. 1, the addition of 1% by weight of chromium to the phosphorus-containing silicon resulted in a substantial increase in selectivity. 100% of the HCl was converted in these runs.

EXAMPLE 2

Silgrain® silicon produced by Elkem ASA was screened to a particle size between 180 and 250 μm. 0.3% and 1% by weight of chromium powder was added to a part of the silicon. Thus three samples of Silgrain® silicon were made; sample C containing 1% by weight of chromium, sample D containing 0.3% by weight of chromium and sample E containing no chromium except for minor impurity.

The chemical analysis of silicon samples C, D and E are shown in Table 2.

TABLE 2

|  | Sample C | Sample D | Sample E |
| --- | --- | --- | --- |
| Si % | 98.28 | 98.98 | 99.28 |
| Al % | 0.232 | 0.232 | 0.232 |
| Ca % | 0.019 | 0.019 | 0.019 |
| Fe % | 0.154 | 0.154 | 0.154 |
| Zr ppmw | 38 | 38 | 38 |

TABLE 2-continued

|  | Sample C | Sample D | Sample E |
|---|---|---|---|
| Sr ppmw | <5 | <5 | <5 |
| Pb ppmw | <5 | <5 | <5 |
| Bi ppmw | <5 | <5 | <5 |
| As ppmw | <5 | <5 | <5 |
| Zn ppmw | <5 | <5 | <5 |
| Cu ppmw | <5 | <5 | <5 |
| Ni ppmw | <5 | <5 | <5 |
| Mn ppmw | 15 | 15 | 15 |
| Cr | 1% by weight | 0.3% by weight | 11 ppmw |
| V ppmw | 12 | 12 | 12 |
| Ba ppmw | <5 | <5 | <5 |
| Ti ppmw | 164 | 164 | 164 |
| Mo ppmw | 15 | 15 | 15 |
| Sb ppmw | <5 | <5 | <5 |
| Sn ppmw | <5 | <5 | <5 |
| K ppmw | <5 | <5 | <5 |
| P ppmw | 24 | 24 | 24 |

Samples C, D and E were used to produce trichlorosilane in a laboratory fixed-bed reactor described above. Two parallel runs were made with sample E. The selectivity for TCS produced from samples C, D and E are shown in FIG. 2.

Figure 2:
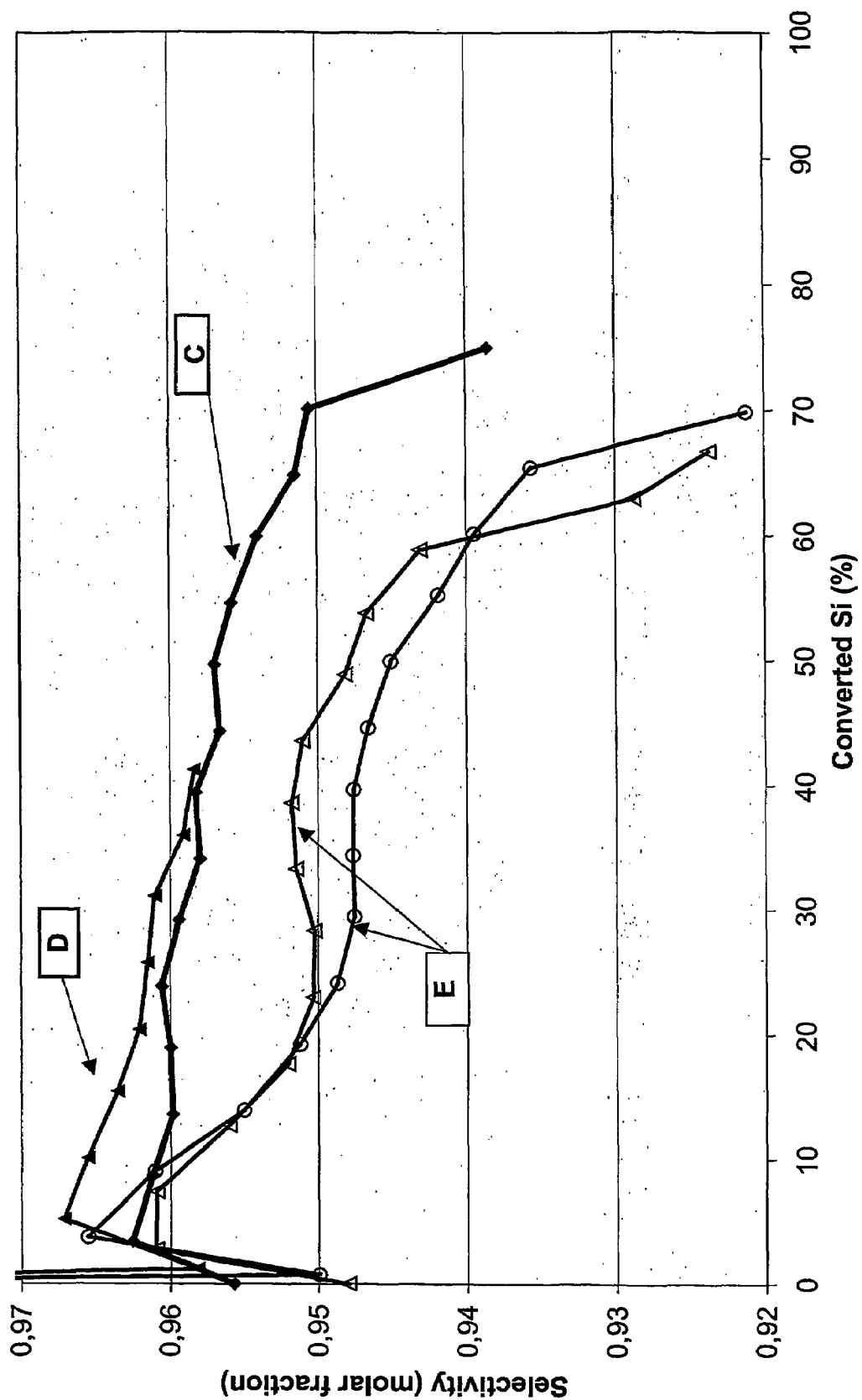

As can be seen from FIG. 2, the addition of 0.3 and 1% by weight of chromium to Silgrain® silicon resulted in a substantial increase in selectivity. 100% of the HCl was converted in these runs.

EXAMPLE 3

Figure 3:
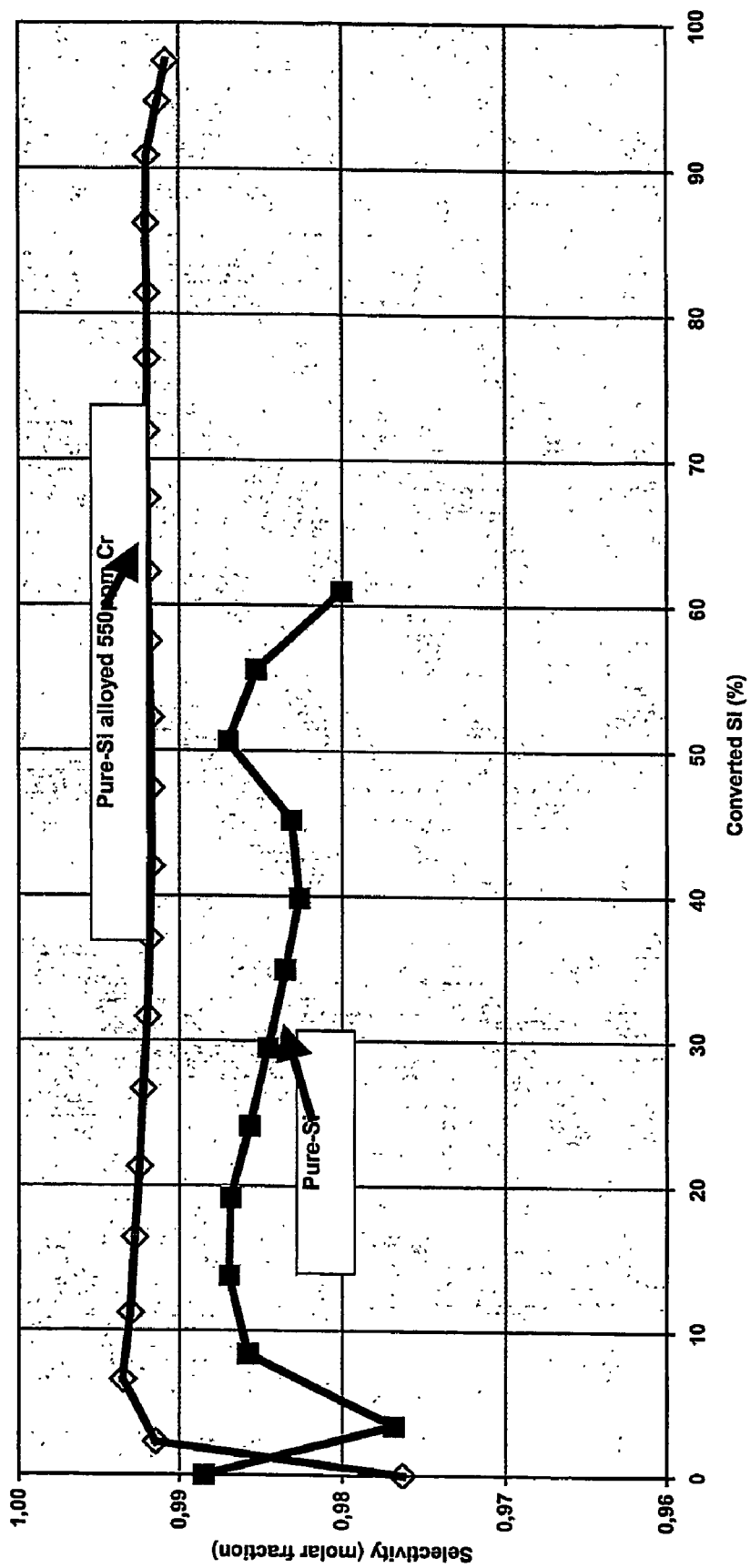
FIG. 3 shows a diagram for the selectivity of TCS and HCl conversion of pure silicon alloyed with 550 ppm Cr according to the present invention and compared with the TCS selectivity using pure silicon.

Pure silicon (polysilicon grade) having a very low content of impurities was alloyed with 550 ppm chromium. The chromium alloyed silicon was used to produce trichlorosilane using the reactor and the method described above. As shown in FIG. 3, the selectivity was higher in the sample with alloyed chromium. 100% of the HCl was converted in these runs.

EXAMPLE 4

Metallurgical grade silicon produced by Elkem ASA (sample F) was crushed and milled to a particle size between 180 and 250 μm. The composition of the sample is given in Table 3. Sample F was used to produce trichlorosilane in a laboratory fluidized-bed reactor described above. Two parallel runs were made, but in the second run 2% by weight (0.1025 gram) of Cr was added separately to the reactor when about 33 grams of silicon was consumed. The selectivity for TCS produced from sample F with and without Cr addition is shown in FIG. 4.

Figure 4:
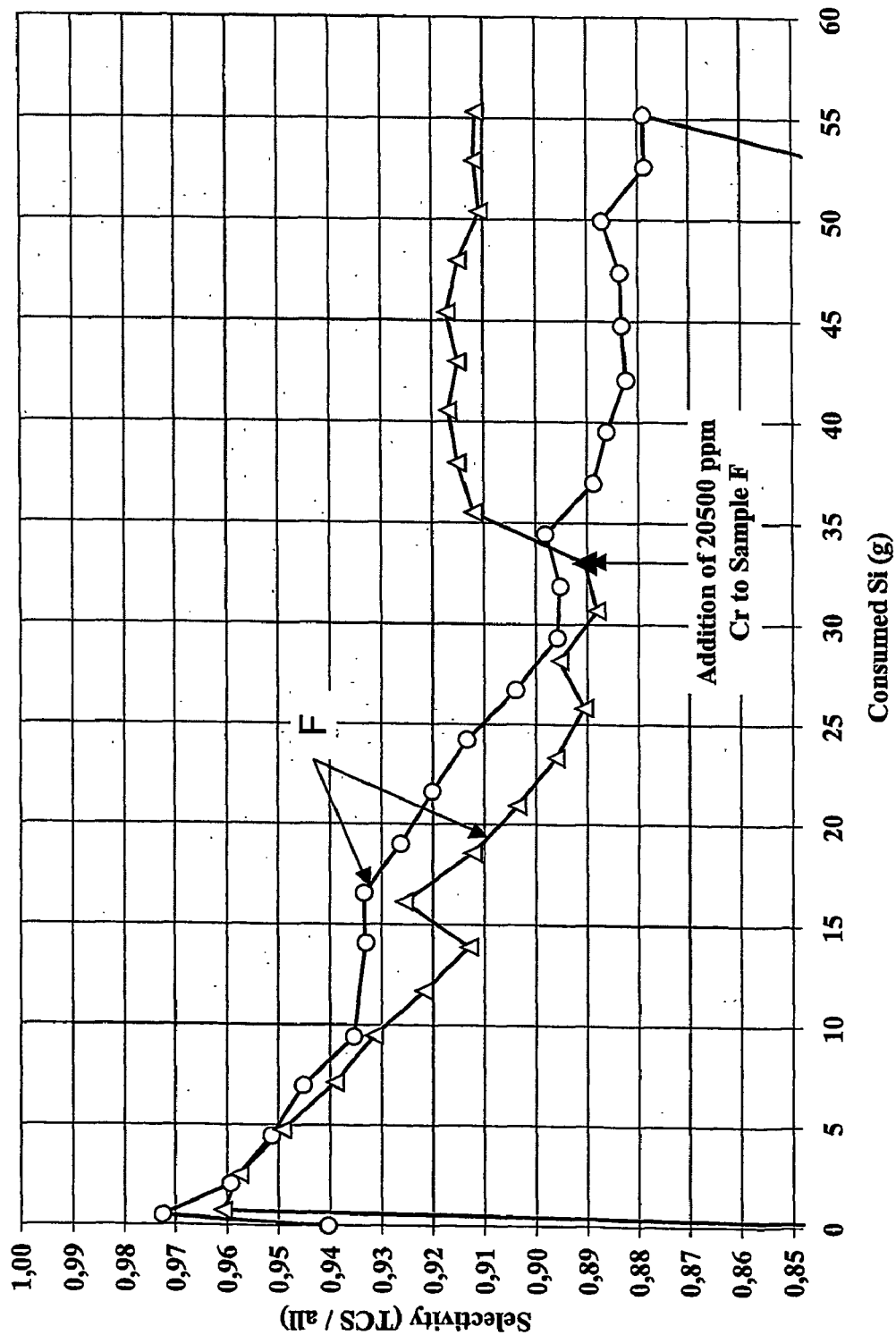
FIG. 4 shows a diagram for selectivity of TCS produced from a commercially available silicon sample in a continuous fluid bed reactor at 365° C. according to the present invention and compared with the TCS selectivity according to TCS produced according to prior art.

As can be seen from FIG. 4, the addition of 2% by weight of chromium to the silicon resulted in about 3% absolute increase in selectivity. 100% of the HCl was converted in these runs.

TABLE 3

|  | Sample F |
|---|---|
| Si % | 99.24 |
| Al % | 0.120 |
| Ca % | 0.014 |
| Fe % | 0.306 |
| Zr ppmw | 6 |
| Sr ppmw | <5 |
| Pb ppmw | <5 |
| Bi ppmw | <5 |
| As ppmw | <5 |
| Zn ppmw | <5 |

TABLE 3-continued

|  | Sample F |
|---|---|
| Cu ppmw | 12 |
| Ni ppmw | 14 |
| Mn ppmw | 82 |
| Cr ppmw | 11 |
| V ppmw | 23 |
| Ba ppmw | <5 |
| Ti ppmw | 228 |
| Mo ppmw | 8 |
| Sb ppmw | <5 |
| Sn ppmw | <5 |
| K ppmw | <5 |
| P ppmw | 17 |

EXAMPLE 5

Metallurgical grade silicon produced by Elkem ASA was crushed and milled to a particle size between 180 and 250 μm. 0.54% by weight of chromium powder was added to a part of the silicon. Thus two samples of silicon were made; sample H containing 0.54% by weight of chromium and sample G containing no chromium except for minor impurity.

The chemical analysis of silicon samples G and H are shown in Table 4.

TABLE 4

|  | Sample G | Sample H |
|---|---|---|
| Si % | 97.68 | 97.14 |
| Al % | 0.132 | 0.132 |
| Ca % | 0.002 | 0.002 |
| Fe % | 1.813 | 1.813 |
| Zr ppmw | 147 | 147 |
| Sr ppmw | <5 | <5 |
| Pb ppmw | <5 | <5 |
| Bi ppmw | <5 | <5 |
| As ppmw | <5 | <5 |
| Zn ppmw | 10 | 10 |
| Cu ppmw | 42 | 42 |
| Ni ppmw | 33 | 33 |
| Mn ppmw | 95 | 95 |
| Cr | 36 ppm | 0.54% by weight |
| V ppmw | 86 | 86 |
| Ba ppmw | 34 | 34 |
| Ti ppmw | 769 | 769 |
| Mo ppmw | 10 | 10 |
| Sb ppmw | 11 | 11 |
| Sn ppmw | <5 | <5 |
| K ppmw | <5 | <5 |
| P ppmw | 56 | 56 |

Figure 5:
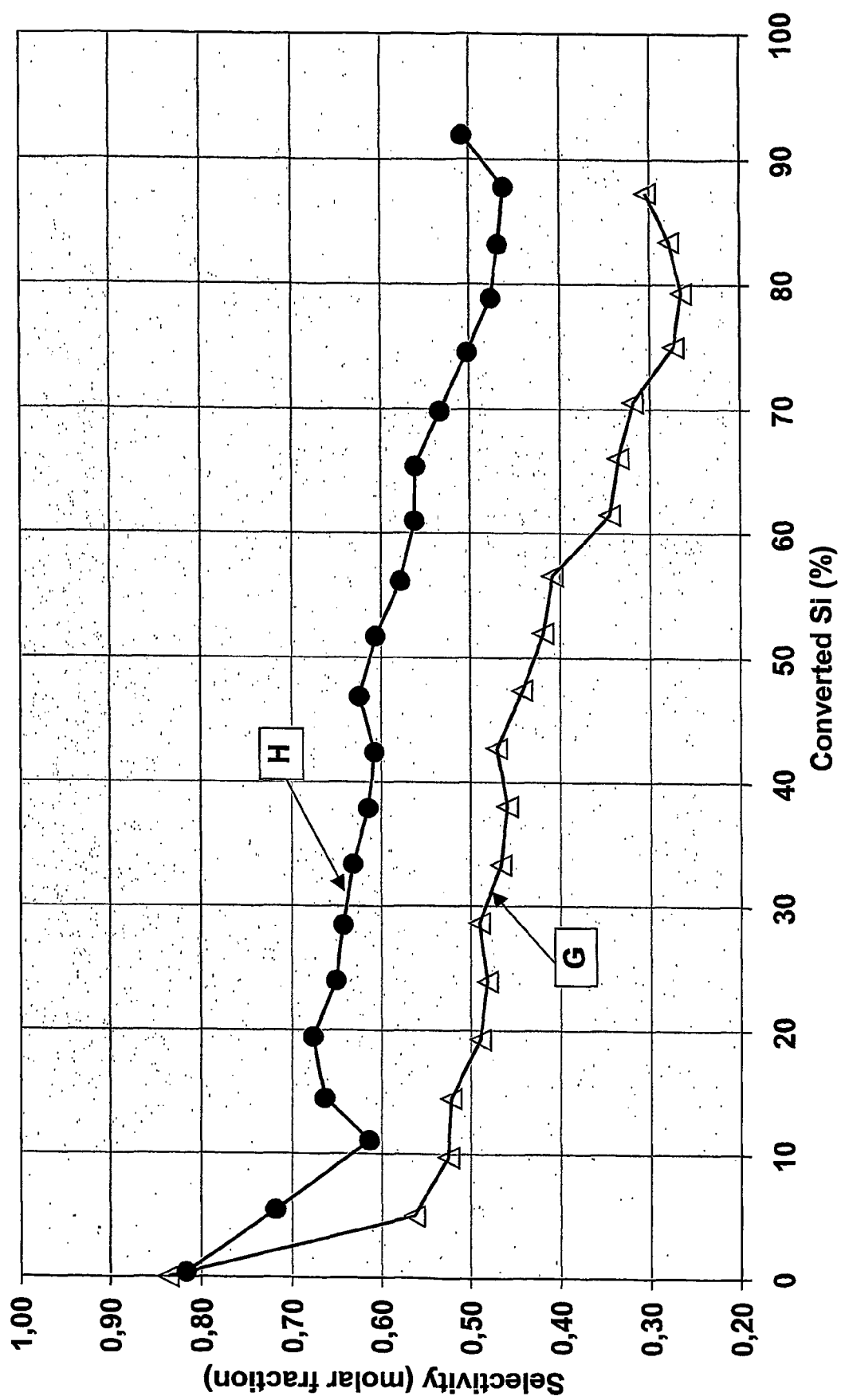
FIG. 5 shows diagram for selectivity of TCS produced from commercially available silicon samples in a fixed bed reactor at 515° C. according to the present invention and compared with the TCS selectivity according to TCS produced according to prior art.

Samples G and H were used to produce trichlorosilane in a laboratory fixed-bed reactor described above. The selectivity for TCS produced from samples G and H are shown in FIG. 5. Compared to examples 1 to 4, higher temperature in the reactor reduced the selectivity significantly, but as can be seen from FIG. 5, the addition of 0.54% by weight of chromium to the silicon resulted in about 15-20% absolute increase in selectivity. 100% of the HCl was converted in these runs.

The invention claimed is:

1. Method for the production of trichlorosilane by reaction of silicon with HCl gas at a temperature between 250° and 1100° C., and an absolute pressure of 0.5-30 atm in a fluidized bed reactor, in a stirred bed reactor or in a solid bed reactor, characterized in that the silicon supplied to the reactor contains between 30 and 10,000 ppm chromium.

2. Method according to claim 1, characterized in that the silicon supplied to the reactor contains between 50 and 1,000 ppm chromium.

3. Method according to claim 1, characterized in that the chromium is alloyed with the silicon.

4. Method according to claim 1, characterized in that the chromium is mechanically mixed with the silicon before the silicon is supplied to the reactor.

5. Method according to claim 4, characterized in that the chromium is mechanically mixed with the silicon by subjecting the silicon to grinding using chromium-containing grinding bodies.

6. Method according to claim 1, characterized in that the chromium is added to the reactor separately from the silicon.

7. Method for the production of trichlorosilane by reaction of silicon with HCl gas at a temperature between 250 and 1100° C., and an absolute pressure of 0.5-30 atm in a fluidized bed reactor, in a stirred bed reactor or in a solid bed reactor, characterized in that chromium is supplied to the reactor in an amount necessary to control a chromium content in the reactor of between 100 and 50,000 ppm based on the weight of silicon in the reactor.

8. Method according to claim 7, characterized in that the chromium is supplied to the reactor in an amount necessary to control the chromium content in the reactor between 200 and 25,000 ppm chromium.

9. Method according to claim 7, characterized in that the chromium supplied to the reactor is alloyed with the silicon.

10. Method according to claim 7, characterized in that the chromium supplied to the reactor is mechanically mixed with the silicon before the resulting mixture is supplied to the reactor.

11. Method according to claim 10, characterized in that the chromium is mechanically mixed with the silicon by subjecting the silicon to grinding using chromium-containing grinding bodies.

12. Method according to claim 7, characterized in that the chromium and the silicon are added separately to the reactor.

13. Method according to claim 12, characterized in that chromium compounds are used as the source for the chromium and the chromium compounds are added to the reactor with the HCl gas.

14. Method according to claim 7, characterized in that the chromium is added to the reactor together with a compound having no effect on the trichlorosilane process.

* * * * *